United States Patent [19]
Anderson

[11] Patent Number: 5,335,142
[45] Date of Patent: Aug. 2, 1994

[54] PORTABLE COMPUTER DISPLAY TILT/SWIVEL MECHANISM

[75] Inventor: William J. Anderson, Anaheim, Calif.
[73] Assignee: AST Research, Inc., Irvine, Calif.
[21] Appl. No.: 994,116
[22] Filed: Dec. 21, 1992
[51] Int. Cl.⁵ .................. H05K 7/16; F16M 11/12; G06F 1/16
[52] U.S. Cl. .................. 361/681; 248/921; 248/183
[58] Field of Search .............. 248/183, 917-923; 312/223.2; 340/700, 711; 364/708, 708.1; 361/679-687, 724-727, 752, 755, 796; 345/905

[56] References Cited

U.S. PATENT DOCUMENTS

| | | |
|---|---|---|
| 4,570,892 | 2/1986 | Czech et al. .................. 248/183 X |
| 4,621,782 | 11/1986 | Carlson et al. .................. 248/183 |
| 4,680,577 | 7/1987 | Straayer et al. . |
| 4,736,191 | 4/1988 | Matzke et al. . |
| 4,739,128 | 4/1988 | Grisham . |
| 4,853,630 | 8/1989 | Houston . |
| 4,858,864 | 8/1989 | Thompson .................. 248/183 X |
| 4,879,556 | 11/1989 | Duimel . |
| 4,919,387 | 4/1990 | Sampson .................. 248/921 |
| 5,034,858 | 7/1991 | Kawamoto et al. .............. 361/681 X |
| 5,119,078 | 6/1992 | Grant . |

FOREIGN PATENT DOCUMENTS

| | | | |
|---|---|---|---|
| 416922 | 3/1991 | European Pat. Off. ....... G06F 1/16 |
| 2-294809 | 12/1990 | Japan .................. G06F 1/16 |
| 3-109621 | 5/1991 | Japan .................. G06F 1/16 |
| 3-161816 | 7/1991 | Japan .................. G06F 1/16 |

OTHER PUBLICATIONS

Howard Bill, "Field Mice: Different, Yes. Better, Maybe" *PC Magazine*, vol. 10, No. 17, pp. 111-112, 123-126, 133 (Oct. 15, 1991).
"Hot PC Products", *Electronic Design*, vol. 38, No. 11, p. 22 (Jun. 14, 1990).
Reinhardt, Andrew, "Touch-and-Feel Interfaces", *Byte*, pp. 223-226 (Feb. 1991).
Dell System 325NC User's Guide, pp. 2-16, 3-1 through 3-4, 3-15, Dell Computer Corporation (Jan. 1992).
"Windows on the Road", Howard Eglowstein, *Byte*, vol. 17, No. 3, pp. 208-213, 216, 218, 220 (Mar. 1992).

*Primary Examiner*—Leo P. Picard
*Assistant Examiner*—Michael W. Phillips
*Attorney, Agent, or Firm*—Knobbe, Martens Olson & Bear

[57] ABSTRACT

A portable computer having a hinge assembly which allows the cover and display screen to be tilted from the base of the portable computer and then swiveled about a vertical axis. One hinge is provided at the rear edge of the base of the portable computer about which the cover both tilts and swivels. The hinge assembly includes stops which limit the amount of tilt and swivel. The cover of the personal computer may be tilted backwards from a closed position to 115° and swiveled 30° from a straight-forward position.

20 Claims, 4 Drawing Sheets

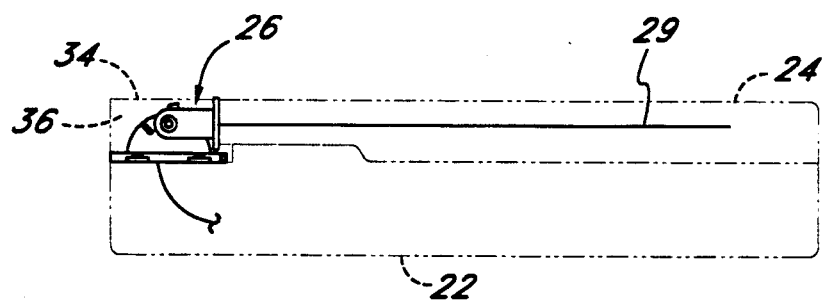
Fig. 3
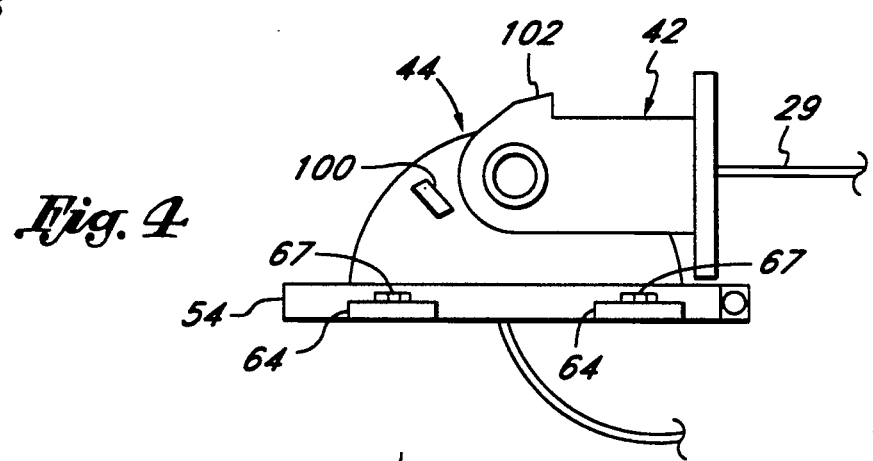
Fig. 4
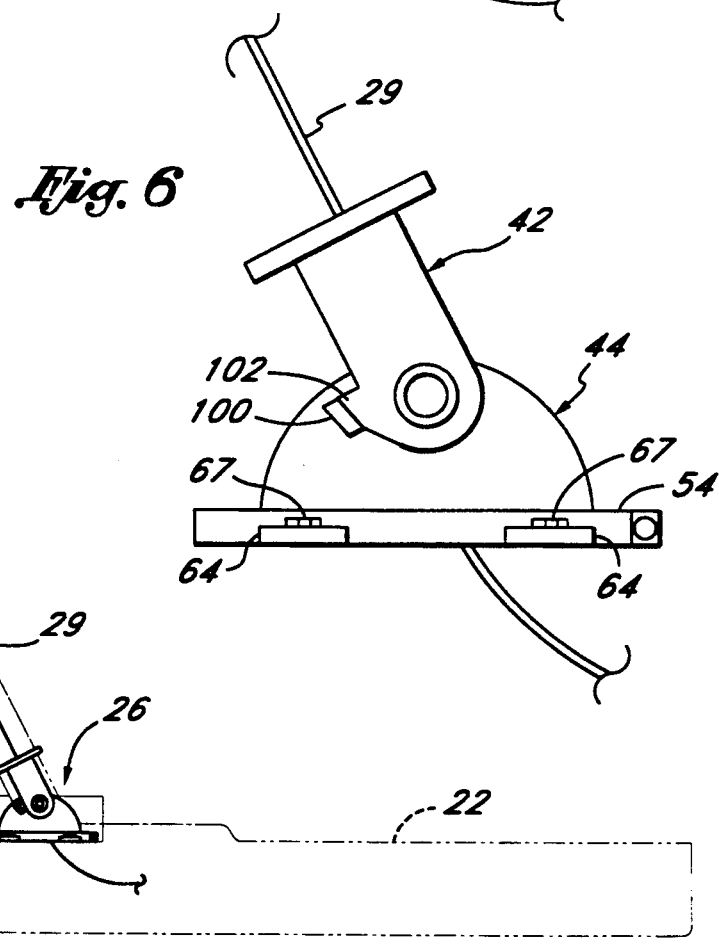
Fig. 6
Fig. 5

PORTABLE COMPUTER DISPLAY TILT/SWIVEL MECHANISM

BACKGROUND OF THE INVENTION

1. Field of the Invention

The present invention relates to portable computer display, and more specifically, to a portable computer display screen which can tilt and swivel about two orthogonal axes.

2. Description of the Related Art

Beginning in the mid-1980's, portable computers, alternately known as either laptops or notebook computers, have expanded in popularity and at an astonishing rate. Such computers are lightweight and have a display screen supported by a hinged cover that protects the keyboard when the computer is not being operated.

Liquid crystal displays (LCDs) are used in many personal computer screens. LCDs are desirable for personal computers in that they are lightweight and have an extremely low power consumption in contrast to cathode ray tube (CRT) displays of conventional desktop computers. In addition, an LCD generally retains a great clarity of display in the presence of bright light.

All of the recent technological advances in portable computer displays have been directed toward improving the visual clarity of the information for a single operator sitting directly in front of the keyboard. However, when the user of a portable computer wants to show the displayed information to other people, they must crowd behind the personal computer or physically turn the computer base to show the information. Given that the typical size of portable computers are smaller than a brief case, and the screen are concurrently small, it is awkward for more than one or two people to view the display of a laptop computer. Furthermore, a sudden movement of a computer while the disk is spinning may induce a head crash. Thus, there is a need for a personal computer which can easily display the information to more than one person without having to shift the base of the computer.

In addition, portable computers are often used on airplanes. It is inconvenient to place the portable computer on the drink tray in front of the user, and instead is preferable to place the computer on the tray next to the user. Without dangerously angling the computer off the end of the drink tray, the user must operate the keyboard and try to read the information on the display screen from approximately a 45° angle. There is thus a need for a portable computer which can be operated from an adjacent airline seat and which displays the information directly to the operator.

SUMMARY OF THE INVENTION

The present invention provides a tilt and swivel mechanism which allows adjustment of a portable computer display in two axes. The mechanism provides conventional tilt movement of the display from a horizontal closed position to an open position of approximately 115° from the closed position. The invention also provides for swiveling of the display about a vertical axis to an angle of 30° to the right or left from directly straight-forward.

In accordance with the preferred embodiment of the present invention, the tilt swivel mechanism comprises a single unit hinge assembly incorporating the tilt and swivel features in one unit. The tilt and swivel hinge is preferably located at the rear center of the portable computer and provides sufficient support for conventional display screens. The tilt/swivel hinge may include a cosmetic cover for concealment purpose.

The preferred tilt/swivel hinge comprises a swivel disk which fits between two identical halves of a swivel ring having an inner groove receiving the swivel disk, and a tilt base and an attachment yoke mounted on the swivel disk. The computer display screen mounts to a flange on the attachment yoke which tilts about a tube extending through the arms of the yoke and through an aperture in the tilt base. The tilt base, with the attachment yoke of the computer display screen, is then mounted to the swivel disk which fits within the two halves of the swivel mounting ring. Thus, the computer display screen tilts relative to the tilt base which in turn, swivels relative to the computer base.

In a preferred embodiment, substantially all of the swivel/tilt hinge assembly comprises plastic parts for weight and economic considerations. Several built-in mechanical stops in the swivel/tilt hinge limit the tilt to 115° from horizontal and the swivel to an arc of 60°, or 30° in each of the clockwise and counter-clockwise directions from straight-forward.

In accordance with a further embodiment of the present invention, the tilt/swivel assembly includes a built-in cable tunnel for communication between the base and the display screen. In addition, a washer comprising a non-sticking material such as Teflon ® or a lubricated washer is disposed between the attachment yoke and tilt base for smooth tilt operation.

The present invention provides a tilt/swivel hinge constructed from a minimum number of parts primarily of plastic which also has strength to support computer display screens of 1-2 lbs.

BRIEF DESCRIPTION OF THE DRAWINGS

FIG. 3 is a side elevational view of the tilt/swivel hinge mechanism installed in the portable computer of FIG. 1, shown in phantom, with the display screen closed.

FIG. 4 is a detailed side elevational view of the hinge mechanism of FIG. 3.

FIG. 5 is a side elevational view of the tilt/swivel hinge mechanism installed in the portable computer of FIG. 1, shown in phantom, with the display screen tilted open.

FIG. 6 is a detailed side elevational view of the hinge mechanism of FIG. 5.

DETAILED DESCRIPTION OF THE PREFERRED EMBODIMENTS

The present invention discloses an improved hinge assembly for notebook or laptop personal computers. The hinge assembly allows the computer display screen to not only be tilted open, but also be swiveled about a vertical axis.

Figure 1:
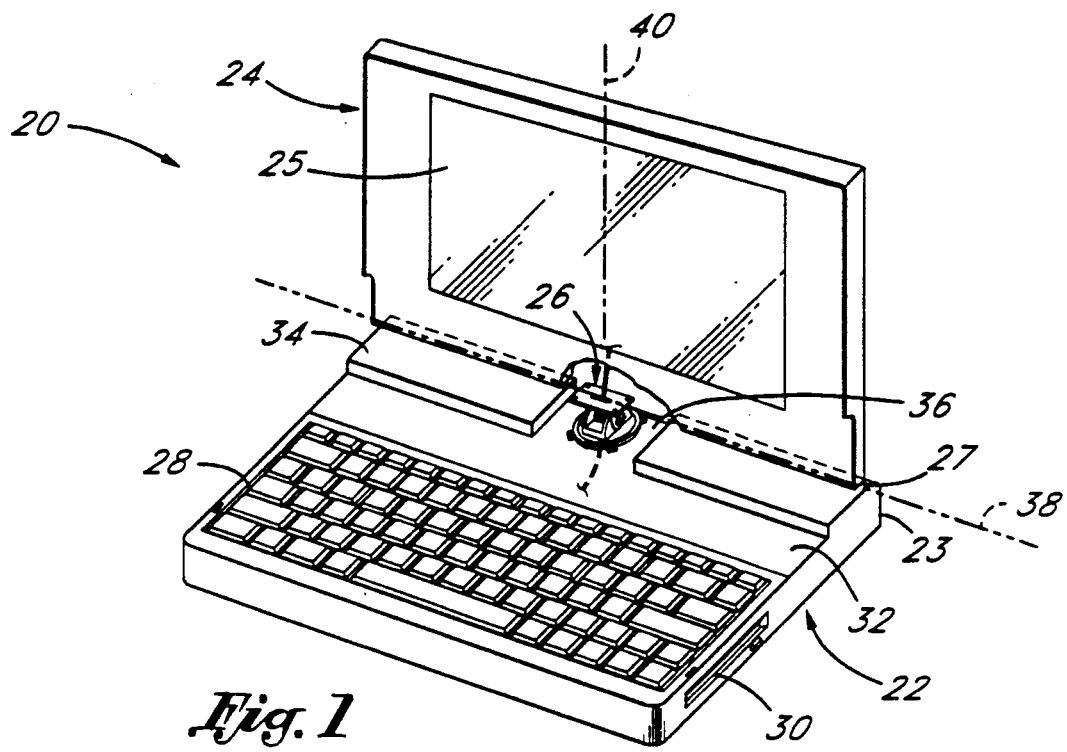
FIG. 1 is a perspective front view showing a personal computer incorporating a tilt/swivel hinge of the present invention with the display screen tilted open.

As seen in FIG. 1, a laptop computer 20 is shown with a cover 24, incorporating a display screen 25, tilted open. The portable computer 20 generally comprises a base 22, and the aforementioned cover 24 attached to the base with a tilt/swivel hinge mechanism 26. The base 22, including a hard drive (not shown), comprises a keyboard panel 28, a floppy disk access port 30, a panel 32 and a rear step 34. The rear step 34 includes a centrally disposed rectangular recess 36 into which the tilt/swivel hinge mounts below the top surface of the cover 24, when closed. Other laptop computer designs may incorporate the tilt/swivel hinge mechanism 26 of the present invention and the illustrated embodiment should not be construed as limiting.

The computer display cover 24 rotates about two axes relative to the base 22. In the closed position of the cover 24, a horizontal tilt axis 38 runs parallel to a rear or bottom edge 27 of the cover, and also parallel to a rear edge 23 of the base 22. The horizontal tilt axis 38 runs through the center of the tilt/swivel hinge 26. A vertical swivel axis 40 passes directly through the center of the tilt/swivel hinge 26. From a closed position, the cover 24 lifts open, or tilts, about the horizontal axis 38 to expose the keyboard 28 and the display screen 25. The cover 24 and the display screen 25 preferably tilt about the horizontal axis 38 to a limit of 115° (where 0° is the fully closed position of the cover). The cover 24 and the display screen 25 may then swivel in a clockwise or counter-clockwise direction about the vertical axis 40. It is preferred that the cover 24 be fully open or tilted back before swiveling, yet the cover is free to swivel at any tilt position greater than that necessary for the bottom edge 27 of the cover to clear the rear step 34.

Although the two axes 38, 40 remain perpendicular to each other during use of the laptop, the horizontal tilt axis may rotate about the vertical axis relative to the base 22. As is apparent in FIG. 2, the swiveling of the cover 24 about the fixed vertical axis 40 allows the cover to tilt about a theoretically infinite number of horizontal axes relative to the base 22. The relative orientation of the axes 38, 40 will be more clearly seen in the discussion of the tilt/swivel hinge of FIGS. 7-9.

Figure 2:
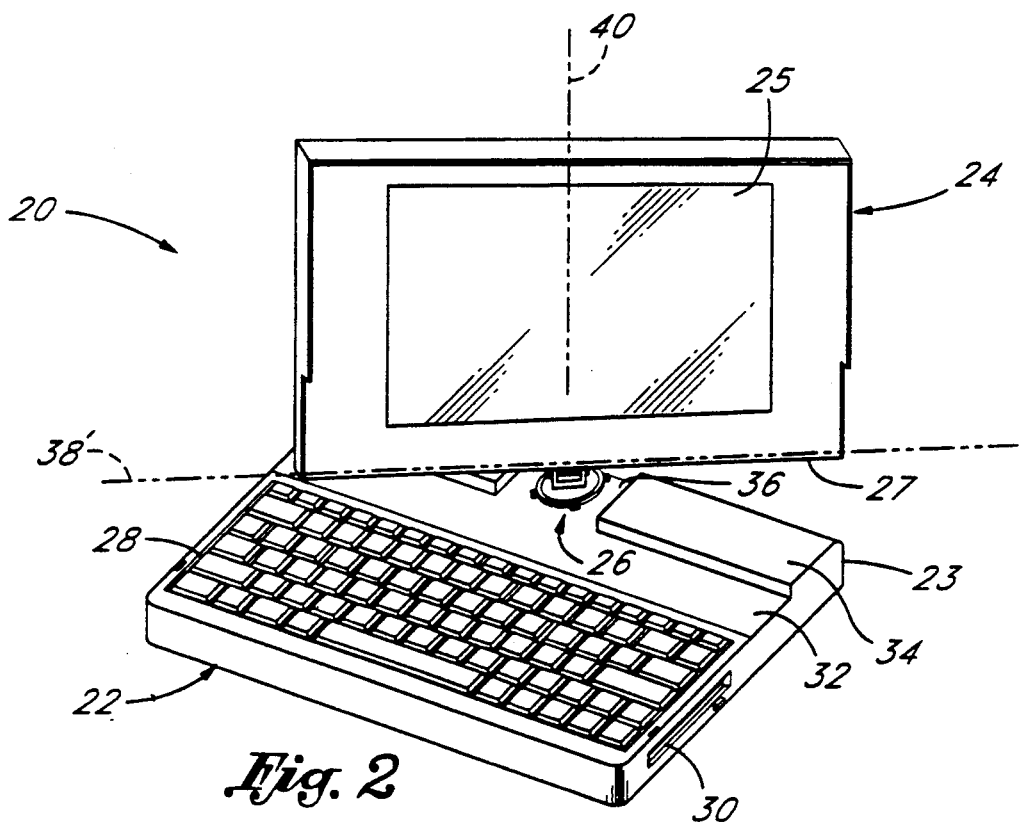
FIG. 2 is a perspective front view showing a personal computer incorporating a tilt/swivel hinge of the present invention with the display screen tilted open and swiveled counter-clockwise.

In a typical configuration of FIG. 2, the cover 24 and display screen 25 have been tilted open and swiveled counter-clockwise from the original straight-on position, when looking from above. The axis 38, originally parallel to the rear edge 23 of the base 22, has swivelled approximately 30° to a new axis 38'. The new axis 38' remains parallel to the rear edge 27 of the cover 24, yet makes a 30° angle with the rear edge 23 of the base 22. The cover 24 thus tilts about the new axis 38' which, in the preferred embodiment, may be oriented anywhere in the range of ±30° from the original axis 38.

A preferred arrangement wherein the tilt/swivel hinge 26 is mounted within the recess 36 is shown in FIGS. 1 and 2. In this arrangement, the hinge 26 mounts completely within the recess 36 so that no portion extends above the top surface of the step 34. The cover 24, pivoting about horizontal axis 38 which similarly lies below the top surface of the step 34, therefore folds closed to fit flush with the step, as seen best in FIG. 3.

FIG. 3 illustrates the personal computer 20 with the cover 24 in the closed position, the display screen 25 thus lying adjacent and directly facing the keyboard 28. A cosmetic panel or flexible cover (not shown) may mount across the recess 36 to hide the tilt/swivel hinge 26 in both the closed and open configurations. Such a cosmetic panel may be attached directly to the base 22 and have an aperture through which the hinge 26 freely tilts and swivels, or may be a flexible material which partially attaches to the cover 24.

FIG. 3 also shows the relative height of the tilt/swivel hinge 26 when closed below the top surface of the step 34. A representative cable 29 from the base 22 communicates with the cover 24 and display screen 25. The cable 29 passes through the tilt-swivel hinge 26 in several ways, as will be described more fully below. FIGS. 3 and 4 also show a tilt stop 100 and a tilt stop tab 102 for limiting the tilt of the cover 24. The tilt range of the hinge 26 and operation of the tilt stop 100 and the tab 102 may be clearly seen in FIGS. 4 and 6.

Figure 7:
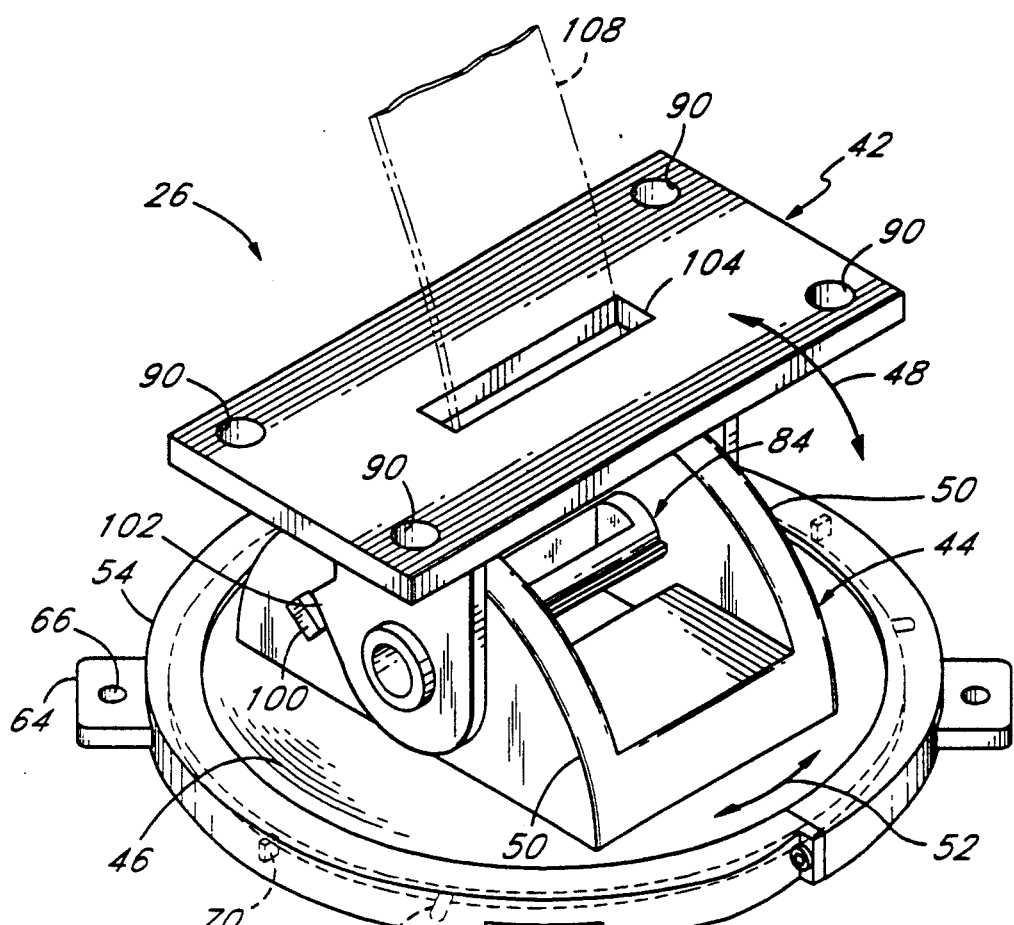
FIG. 7 is a perspective view of the assembled tilt/swivel hinge of FIG. 1 showing one path for cabling.

Referring to FIG. 7, the tilt/swivel hinge 26 generally comprises a cover attachment yoke 42 which tilts about a tilt base 44 attached to a circular mount or swivel disk 46. As shown by a double-headed arrow 48, the attachment yoke rotates about a horizontal axis passing perpendicularly through two upstanding walls 50 of the tilt base 44. The tilt base 44, the attached yoke 42 and the swivel disk 46 rotate about a vertical axis in either direction shown by a double-headed arrow 52 relative to a swivel mounting ring 54 affixed to the base 22 of the computer.

Figure 9:
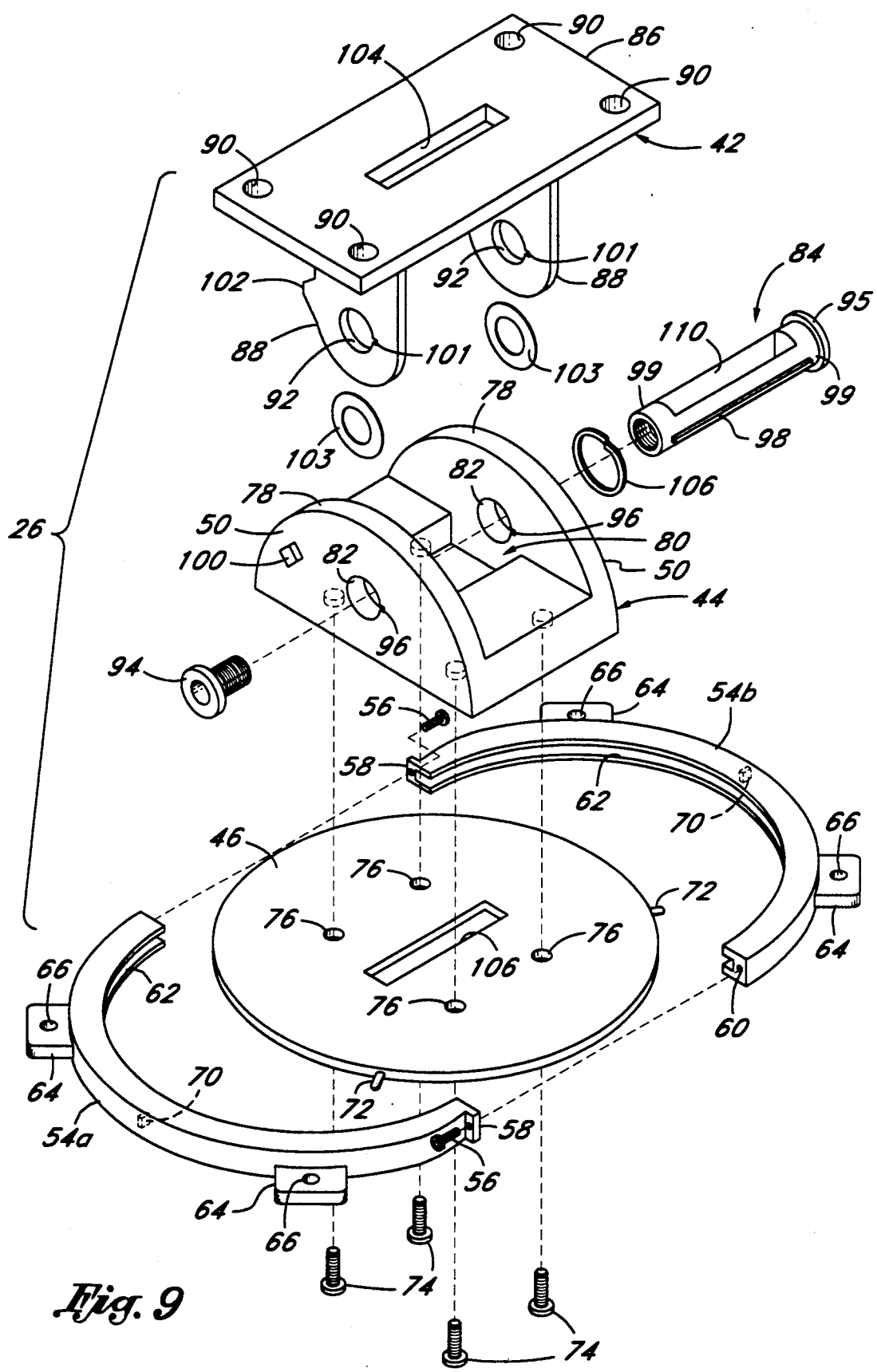
FIG. 9 is a perspective exploded view of the tilt/swivel hinge of FIGS. 7 and 8.

With reference to both FIGS. 7 and 9, the swivel mounting ring 54 forms a continuous circle defined by a two-part plastic assembly held together with machine screws 56 and threaded holes 60 at their abutting ends. For the following description, an arbitrary horizontal centerline of the mounting ring 54 passes through the adjoining ends parallel to the swivel disk 46. In the preferred embodiment, identical semi-circular left and right mounting ring halves 54a and 54b join together with the machine screws 56 in the threaded holes 60. Although the mounting ring halves 54a and 54b are shown identical for simplicity of manufacture and interchangeability, and thus like components will be referred to with a single number, the mounting ring halves are not required to be interchangeable, and may have different configurations.

The machine screws 56 pass through an aperture in an outwardly extending flange 58 on one mounting ring half 54a or 54b to affix in the threaded receiving hole 60 in the second ring half. The reverse situation occurs at the opposite side, whereby the flange 58 is on the second ring half and the threaded receiving hole 60 on the first ring half. Two mounting tabs 64 are provided on each mounting ring half 54a and 54b, approximately 45° from each end. The tabs 64 include apertures 66 for machine bolts 67 (FIGS. 4 and 6) to extend through and securely attach the mounting ring to the computer base 22.

The peripheral edge of the swivel disk 46 rides in a channel or groove 62 formed on the inner circumference of the mounting ring 54. The groove 62 retains the swivel disk 46 in a close sliding fit. A stop block 70 is provided within the groove 62 approximately 90° around the perimeter of the ring 54 from the adjoining ends (i.e., approximately halfway between the two ends).

The flat circular tilt mount/swivel disk 46 preferably is constructed of a hardened lightweight plastic. The diameter of the disk 46 is slightly smaller than the inner diameter of the groove 62 of the assembled halves of the swivel mounting ring 54. The outer rim of the disk 46 includes two outwardly projecting stop tabs 72, spaced apart from each other by approximately 120° around the perimeter of the disk. The stop tabs 72 project within the groove 62 of the mounting ring 54 to contact the stop blocks 70. Both stop tabs 72 are disposed angularly forward of the stop blocks 70, and the orientation of the stop tabs 72 is such that the swivel disk 46 has a 60° range of movement. Thus, as in the illustration of FIG. 7, the swivel disk 46 may turn 30° from the neutral position shown in either direction of arrow 52 before the stop tabs 72 hit the stop blocks 70.

Other ranges of motion of the swivel disk 46 are possible, the embodiment shown only represents one preferred swivel angle range. Additionally, it is contemplated that the swivel disk 46 be capable of an indexed movement, and have angular holding positions at increments of 5°, 10°, 15° or other incremental values. The holding may be accomplished with a ratchet mechanism or spring-loaded detent, or other similar mechanism well known to one skilled in the art.

The tilt base 44 comprises a mounting foundation for the tilt mechanics and is preferably constructed of plastic, but may be fabricated from other lightweight and strong materials well known in the art. As seen in FIG. 9, the tilt base 44 includes a flat lower surface (not shown) which attaches flush to the swivel disk 46 with four screws 74 extending upward from underneath the disk via four through-holes 76. The tilt base 44 includes the two upstanding walls 50 having upper arcuate surfaces 78 which define an access gap 80 therebetween. Aligned circular apertures 82 pass transversely through the side walls 50 of the tilt base.

A tilt tube 84 extends through and is supported by the apertures 82 in the tilt base walls 50 to provide a pivot shaft for the computer cover 24. In this respect, the attachment yoke 42 comprises an attachment plate 86 and two downwardly extending pivot arms 88 which rotate on the tilt tube 84. The attachment plate 86 preferably includes four holes 90 through which machine screws (not shown) pass to rigidly secure the plate flush with the bottom end 27 of the cover 24. The pivot arms 88 are spaced apart to extend down around the outside of the tilt base walls 50. Circular apertures 92 in both pivot arms 88 line up with the wall apertures 82, the tilt tube 84 thus extending through all four aligned apertures.

As seen in FIG. 5, the pivot arms 88 extend a sufficient distance to support the attachment plate 86 and connected cover 24 above the step 34 when the cover is tilted open. Thus, the cover 24 may freely swivel without risk of contacting the step 34.

The tilt tube 84 includes two end caps 94, 95 which retain the tilt tube within the apertures 82 and 92 of the tilt base 44 and yoke 42, respectively. The hollow removable tilt tube end cap 94 threadingly engages a female inner bore 97 in the end of the tilt tube 84 to hold the tilt tube, attachment yoke 42 and tilt base 44 together. Likewise, the opposite end cap 95 may be removable or fixed to the tube 84, as desired.

The attachment yoke 42 freely rotates about the tilt tube 84, while the tilt tube is constrained from rotating relative to the tilt base 44. In this regard, notches 96 in the tilt base wall apertures 82 receive an index tab 98 on the tilt tube 84 to provide a rotational lock, locating the tilt tube relative to the tilt base 44. The index tab 96 extends along the middle portion of the tilt tube 84, leaving cylindrical end portions 99 over which the attachment yoke arms 88 pivot. The pivot arms 88 also include corresponding notches 101 which receive the index tab 98 during insertion of the tube 94, but which are proximate to the cylindrical end portions 99 during operation to permit the yoke 42 to tilt.

A pair of washers 103 comprising Teflon ® or other suitable non-sticking material install between the inner yoke arms 88 and the outer tilt base walls 50 to reduce friction and wear. A spring steel compression washer 106 fits between the tilt tube end cap 95 and outer side of the yoke arm 88 to apply tension to the tilt tube assembly and reduce the possibility of loosening of the end caps 94.

A tilt stop 100 protrudes from the outside face of each tilt base wall 50. The tilt stop 100 presents an obstruction for a tilt stop tab 102 on the rear edges of each attachment yoke arm 88. As the attachment yoke 42 pivots from a cover closed position shown in FIG. 3 to a cover open position in FIG. 5, the tilt stop 100 and stop tab 102 contact and prevent farther rotation, thus limiting the angle of tilt of the cover 24.

Other tilt ranges of the cover 24 are possible, the embodiment shown only represents one preferred tilt angle range. Additionally, it is contemplated that the attachment yoke 42 be capable of an indexed movement, and have angular holding positions at increments of 5°, 10°, 15° or other incremental values. The holding may be accomplished with a ratchet mechanism or spring-loaded detent, or other similar mechanism well known to one skilled in the art.

As illustrated in FIGS. 7 and 9, a communication cable 108 between the cover 24 and base 22 passes through a first slot 104 in the attachment plate 86, around the tilt tube 84 within the access gap 80 and thereafter enters the base 22 through a second slot 106 formed in the swivel disk 46. Some slack is provided in the cable 108 within the access gap 80 to accommodate relative motion between the rear edge of the cover 24 and base 22.

Figure 8:
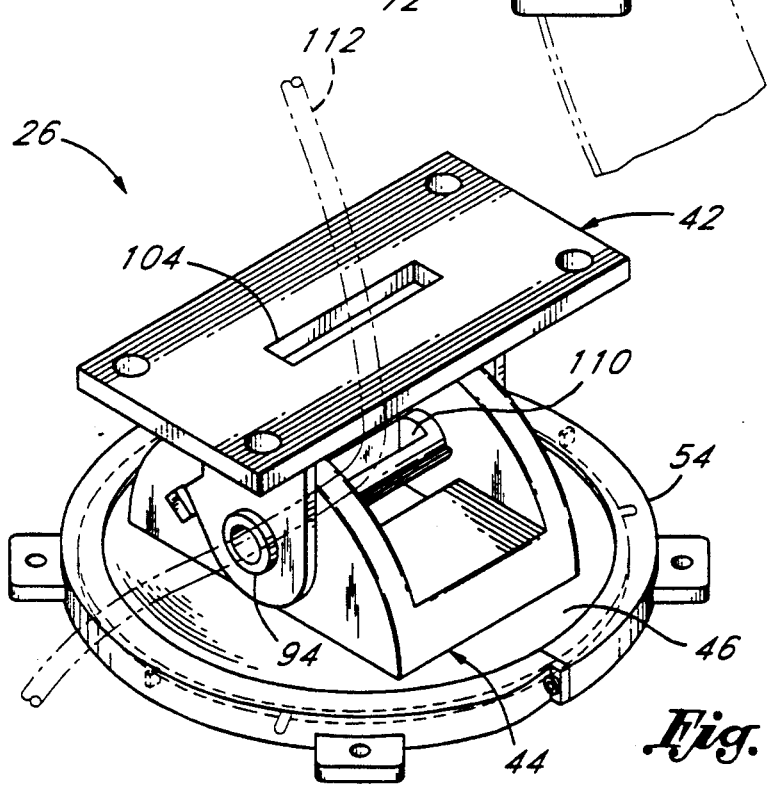
FIG. 8 is a perspective view of the assembled tilt/swivel hinge of FIG. 1 showing an alternative path for cabling.

Referring now to FIG. 8, the tilt tube 84 preferably consists of a hollow cylinder. An opening 110 to the hollow center, directly under the first cable slot 104 in the yoke attachment plate 86, provides a pathway for an alternative communication cable 112 to pass between the cover 24 and base 22. The cable subsequently exits from the hollow end cap 94 and thereafter into the base 22 via an aperture (not shown) in a side wall of the recess 36.

Although this invention is described in terms of certain preferred embodiments, other embodiments that will be apparent to those of ordinary skill in the art are also within the scope of this invention. Accordingly, the scope of the invention is intended to be defined by the claims that follow.

What is claimed is:

1. A portable computer, comprising:
   a base;
   a cover incorporating a display screen;
   a hinge assembly connecting said cover and said base, said hinge assembly movable in two axes to permit said cover to tilt about a horizontal axis and to swivel about a vertical axis relative to said base, said hinge assembly comprising:
- a mounting ring attached to said base, said mounting ring having an inner surface, said mounting ring further comprising a split mounting ring assembly having two semicircular members, each member having respective ends, said two semicircular members positioned so that said ends are abutting, said abutting ends fastened together to form a circle;
- a swivel disk adapted to swivel about said vertical axis, said swivel disk having a peripheral edge located within said mounting ring and guided by said inner surface of said mounting ring; and
- a tilt assembly mounted to said swivel disk and also to said cover of the portable computer.

2. The portable computer of claim 1, wherein said tilt assembly comprises:
- a tilt base mounted to said swivel disk;
- a tilt tube held horizontally within aligned apertures in said tilt base and held rotationally with respect to said tilt base;
- a yoke having a mounting plate for mounting said yoke to said cover and two arms having aligned apertures sized to freely rotate over cylindrical regions of said tilt tube, whereby said cover mounts to said yoke to rotate about said tilt tube, tilt base and swivel disk.

3. The portable computer of claim 2, wherein said hinge assembly includes a pathway through which a cable may travel from said base to said cover.

4. The portable computer of claim 3, wherein said pathway extends directly through said swivel disk into said base.

5. The portable computer of claim 3, wherein said tilt tube is hollow and said pathway extends into a central aperture of said tilt tube and out through an end of said tilt tube.

6. The portable computer of claim 1, wherein said hinge assembly is mounted in a recess in said base so as not to project above the upper surface of said cover when said cover is closed.

7. The portable computer of claim 1, wherein said hinge assembly is provided with stops which limit the angle of tilt.

8. The portable computer of claim 1, wherein said hinge assembly is provided with stops which limit the angle of tilt to a maximum of 115° from the horizontal closed position of said cover.

9. The portable computer of claim 1, wherein said hinge assembly includes swivel stops which limit the angle at which the cover may be swiveled.

10. The portable computer of claim 1, wherein said hinge assembly includes swivel stops which limit the angle at which the cover may be swiveled relative to the base to 30° in either direction from an initial position where a bottom edge of said cover is parallel to a rear edge of said base.

11. The portable computer of claim 1, wherein said hinge assembly comprises plastic parts.

12. The portable computer of claim 1, wherein:
- each semicircular member includes a first end having a flange and a second end having a mounting surface; and
- fasteners pass through said flanges on each ring member and connect with said mounting surfaces on the other ring member.

13. The portable computer of claim 1, wherein said two semicircular members are identical.

14. The portable computer of claim 1, wherein said mounting ring includes an inner circular groove defining a guide channel for said peripheral edge of the swivel disk.

15. The portable computer of claim 14, wherein said inner groove further includes at least one stop block therein and said swivel disk includes at least one outwardly extending stop tab arranged to interfere with said stop block and limit the angle of swivel of said swivel disk.

16. A portable computer, comprising:
- a base;
- a cover incorporating a display screen;
- a hinge assembly interconnecting said cover and said base, said hinge assembly movable in two axes to permit said cover to tilt about a horizontal axis and to swivel about a vertical axis relative to said base;
- a mounting ring attached to said base;
- a swivel disk adapted to swivel about said vertical axis within said mounting ring;
- a tilt assembly mounted to said swivel disk and also to said cover of the portable computer;
- a tilt base mounted to said swivel disk;
- a hollow tilt tube held within aligned apertures in said tilt base; and a yoke comprising:
  - a mounting plate for mounting said yoke to said cover; and
  - two arms having aligned apertures sized to freely rotate over said tilt tube, whereby said cover mounts to said yoke to rotate about said tilt tube, tilt base, and swivel disk.

17. The portable computer of claim 16, wherein said hollow tilt tube includes a centrally disposed opening in communication with open ends of said tube.

18. The portable computer of claim 17, wherein:
- said hinge assembly includes a pathway through which a cable is routed from said base to said cover; and
- said pathway extends into said opening of said hollow tilt tube and out through one of said open ends of said tilt tube.

19. The portable computer of claim 17, wherein said tilt tube is held horizontally within said aligned apertures by at least one demountable end cap on said tilt tube.

20. The portable computer of claim 19, wherein said tilt tube is held rotationally with respect to said tilt base by a tab on one of said tilt tube or said base and a notch on the other of said tilt tube or said base.

* * * * *